June 13, 1933.   B. S. LACY   1,914,135
PROCESS FOR PRODUCING CARBON HALIDES
Filed July 23, 1930
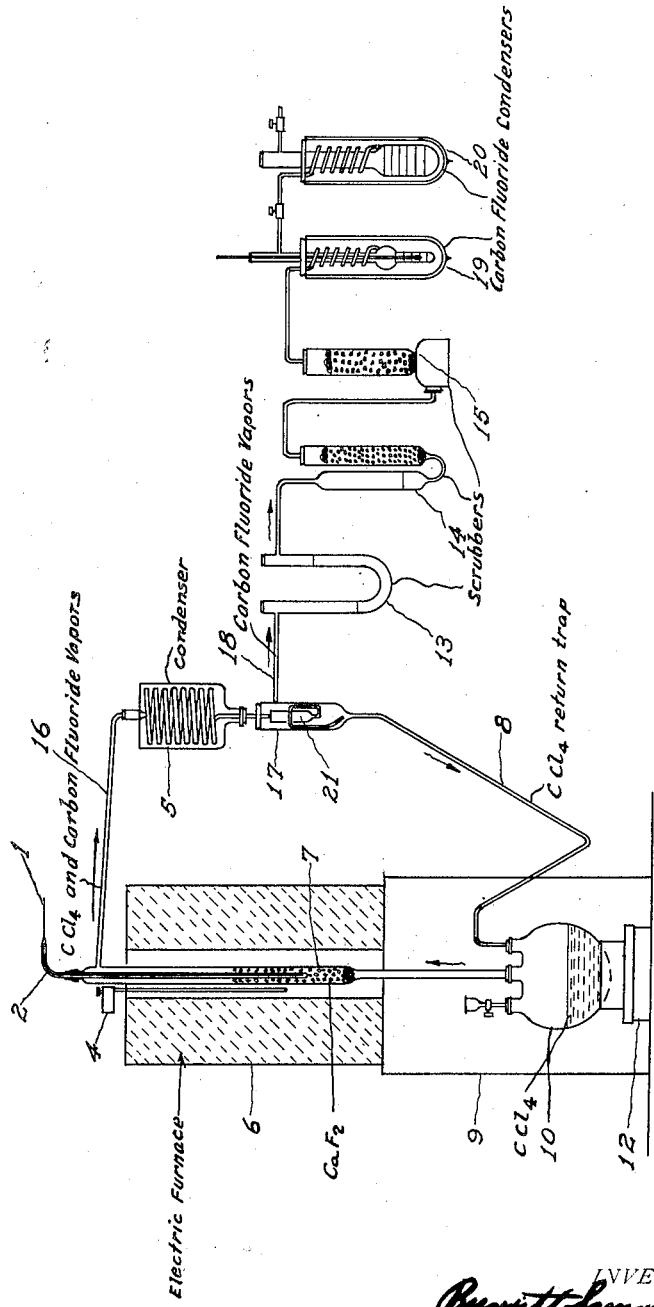

Patented June 13, 1933

1,914,135

UNITED STATES PATENT OFFICE

BURRITT SAMUEL LACY, OF RED BANK, NEW JERSEY, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS FOR PRODUCING CARBON HALIDES

Application filed July 23, 1930. Serial No. 470,092.

This invention relates to the production of carbon-chlorine-fluorine compounds, and more particularly to the production of dichloro difluoro methane and trichloro monofluoro methane.

It has previously been proposed to manufacture such carbon-chlorine-fluorine compounds from antimony trifluoride and carbon tetrachloride by heating them under pressure and causing the reaction to take place in the liquid phase from which the fluorinated compounds distill off as formed. The cost of the product by this method is relatively high due to the cost of the fluorine compound used as one of the raw materials.

The object of this invention is the production of such carbon-chlorine-fluorine compounds from carbon tetrachloride and alkaline earth metal fluoride or an alkali metal fluoride. In pursuance of this object I have found that carbon-chlorine-fluorine compounds can be made, for example, by treating the relatively cheap calcium fluoride with carbon tetrachloride vapors, or treating sodium fluoride with carbon tetrachloride.

My process consists briefly in vaporizing carbon tetrachloride and passing the vapors through a reaction vessel containing the heated fluoride. Preferably I heat to temperatures over 350° C., but do not wish to be restricted to this minimum of temperature since the process may be economically feasible at other temperatures under varying conditions. The vapors coming from the reaction vessel containing the heated fluoride are passed through a water cooled or refrigerated condenser, which returns unreacted carbon tetrachloride to the vaporizer while allowing the gaseous products containing fluorine to pass on; these gaseous products are next scrubbed for purification and then liquefied by passing into a low temperature condenser or by compression and water cooling. My invention will be more particularly described in connection with the production of the carbon-chlorine-fluorine compounds from calcium fluoride.

Apparatus suited for carrying out the process is diagrammatically illustrated in the attached drawing. Referring to the drawing, 7 is a reaction tube containing calcium fluoride into which extends the thermocouple well 2 containing the thermocouple 1 for recording the temperature reached by the calcium fluoride. The reaction tube is shown in a vertical position and the carbon tetrachloride flow as being upward; but obviously the shape, size or arrangement of the furnace and the other devices may be widely varied as long as proper means are afforded for passing carbon tetrachloride vapors over or through the heated calcium fluoride. The lower end of the reaction tube 7 is connected to the carbon tetrachloride vaporizer 10 on the heater 12; an electric furnace 6 is supported by 9 and placed as to surround the reaction tube; 4 is a temperature regulator for adjusting the amount of heating by 6. A connection 16 leads from the upper end of the reaction tube 7 to the condenser 5. The lower end of the condenser 5 is connected to the carbon tetrachloride return line and trap 8; the upper end of the return line is arranged to form a liquid-gas separating means 17, having a gas exit 18 leading to scrubbers such as 13, 14 and 15. These are in turn connected to the low temperature condenser and collector 20. The liquid-gas separating device 17 is shown provided with a reflux metering periodic siphon-overflow device 21; a calibrated collecting condenser 19 is shown placed between the scrubbers and the final collector 20. The reflux meter 21 and the measuring collector 19 are not essential to the usual operation but are shown as means used for determining rates of flow and production referred to later.

In operating, the heating current is first turned on the furnace 6 until the temperature of the calcium fluoride packed in the reaction tube 7 has reached the desired point. Carbon tetrachloride is then vaporized from the flask 10 by means of heater 12 and passes through the calcium fluoride, where a portion is converted to the fluorides which boil at temperatures much below the boiling point of carbon tetrachloride. The gas mixture after leaving the reaction tube passes through the condenser 5 which is satisfactorily cooled by water, though other cooling means or regulated control of the water temperature may be applied to secure regulated cooling or to secure higher or lower cooling than afforded by ordinary water supply. The major portion of carbon tetrachloride is here liquefied and, saturated with the various gases at the temperature of the condenser, separated from the gaseous fluorine compounds. The condensed carbon tetrachloride returns to the flask 10, and the uncondensed gases pass to the scrubbers. The attached drawing shows three scrubbers; 13 contains dilute aqueous sodium hydroxide solution to scrub out any silicon compounds or acidic gases such as chlorine and $CO_2$; 14 also contains dilute caustic solution to complete the removal of silicon compounds and the like; 15 contains $CaCl_2$ for removing water vapor. From the scrubbers the gases pass on and liquefy in the low temperature condenser 19, where the product can be measured. When this has been accomplished the temperature of 19 is raised and the product distilled to the collector 20. The product may of course be collected directly in 20 by omission of 19. The gases may if desired be liquefied by means of moderate compression (say to 40–80 lbs. pressure) followed by water cooling, instead of using the low temperature condenser shown in the drawing.

I have found that various forms of calcium fluoride, such as precipitated calcium fluoride or natural fluorspar, are suitable for this reaction. The material may be used in the powdered or pill form, with suitable provision for effecting good contact between the solid and the tetrachloride vapor, together with a fairly uniform and easy flow of the latter through the solid. In order to obtain a good rate of reaction it is desirable that the calcium fluoride shall be brought to a fine state of subdivision, after which it may satisfactorily be made use of either as such, or in the pill or otherwise agglomerated form prepared from this. Thus a natural fluoride which has been crushed and screened between 10 and 20 mesh reacts only slowly; while if powdered to about 200 mesh a high rate of reaction is obtained whether this powder is used as such or is first incorporated into pills of about ¼ inch diameter. A small proportion, e. g. 2%, of $CaCl_2$ added to the $CaF_2$ before pilling has been found useful as a binder. Preferably I employ a high purity fluorspar, since various impurities slow down the rate of reaction to uneconomical speeds.

The rate of reaction under proper conditions is quite rapid; for example I have carried on the reaction at the rate of over 200 pounds product per cubic foot of furnace space per 24 hours. Moreover the single pass conversion is quite high; thus over 30% of the carbon tetrachloride vapor entering the reaction tube has been converted to chlorofluorides in one passage through the calcium fluoride.

Under the conditions employed in the experiments herein described I have found that the rate of reaction is satisfactory between about 450° C. and 550° C., although at lower temperatures I have secured similar products at the cost of decreased rate of reaction.

In general there is little, if any, production of the two lower boiling compounds, $CF_4$ (boiling point −136° C.) and $CF_3Cl$ (boiling point −83°); but the product consists essentially of $CF_2Cl_2$ (boiling point about −25°) and $CFCl_3$ (boiling point about +25°), together with a small proportion of $CCl_4$ (boiling point 77°) carried along with the $CF_2Cl_2$ and $CFCl_3$ from the separator 17. By varying the temperature maintained in the condenser 5, the $CFCl_3$ accompanying the $CF_2Cl_2$ as it leaves the reaction vessel may either be largely returned to the vaporizer for conversion to $CF_2Cl_2$, or passed along and condensed with the $CF_2Cl_2$, from which it, together with any $CCl_4$, may be easily separated by rectification. It is thus relatively easy to obtain a crude product which consists chiefly of $CF_2Cl_2$, together with only a moderate proportion of $CFCl_3$ and only traces of $CCl_4$. In general a minimum of $CCl_3F$ is produced if the rate of $CCl_4$ supply is slow and the temperature of the condenser 5 is kept low, for example at about 0° C., since the greater portion of $CCl_3F$ formed will then be returned with the $CCl_4$. Higher $CCl_3F$ production occurs with high rate of $CCl_4$ supply to the reaction tube and maintenance of a temperature of for example 40—50° C. in the condenser 5 so as to allow the $CCl_3F$ to pass on uncondensed.

The rate of reaction is only moderately slowed up by the calcium chloride which forms on the fluoride as reaction proceeds, so that under properly regulated conditions a large part of the original charge of calcium fluoride, for example well over 30%, may be economically utilized in the reaction before the speed becomes too slow for practical purposes. When such stage has been reached, the residue may be washed free of calcium chloride and again charged into the reactor. If unduly high temperature and unduly long exposure of the vapors in the reaction vessel are avoided, there is relatively little destruction of the carbon tetrachloride by side reactions.

I have found that at 400° C., the rate of reaction is approximately about $\frac{1}{10}$ that at 500° C., while at 350° C., it is only about 1/100 as great as at 500° C.; at temperatures above about 550° C., there seems to be an appreciable and increasing loss due to side reactions; at 644° C., the existence of the eutectic point for $CaF_2$ and $CaCl_2$ causes fusion to occur. I therefore prefer to work at temperatures between 350° C., and the fusion point of the calcium chloride-fluoride mixture formed and, preferably between about 450° and 550°.

The following examples are given by way of illustration of the process of my invention, but since I have found that the conditions may be varied within quite wide limits, I do not wish to be limited to the exact temperature and other conditions mentioned.

*Example I*

Into a horizontal "Pyrex" reaction tube of 40 mm. internal diameter was charged 175 g. of precipitated calcium fluoride, nearly filling the cross-section of the tube through a reaction zone 22 cm. long and having a volume of about 270 cc. This was heated to 500° C. by a furnace surrounding the tube. Through this reaction tube was circulated the vapor from carbon tetrachloride; except for the horizontal reaction tube the apparatus was as illustrated in the attached drawing. In 6½ hrs. there was obtained 50 cc. of liquid product. This product began to boil a little above −30° C., and over one-half of it boiled off below −10°, indicating that the chief constituent was $CF_2Cl_2$. The rate of production of the product corresponds approximately to an S. T. Y. of $$\left(\frac{50 \times 1.7 \times 24 \times 28300}{454 \times 6.5 \times 270} = \right) 73 \text{ lbs.}$$

product per cu. ft. of reaction space per 24 hours.

*Example II*

Precipitated calcium fluoride was formed into pills of ⅜″ diameter and then crushed. Of these granules of size between 10 and 20 mesh 390 g. (=5 moles) were charged into a "Pyrex" glass tube of about 5 cm. diameter, occupying therein about 350 cc. A charge of 230 g. of $CCl_4$ was placed in the vaporizer flask 10 and the vapor from the heated flask circulated through the reaction tube for 100 minutes while keeping the temperature in the tube at 500° C.; the temperature of the condenser 5 was kept at 0°.

At the end of this period 212 g. of $CCl_4$ had disappeared from the vaporizer and 136 g. of liquid product had collected in the condenser 19, kept at −80°. A second charge of $CCl_4$ was then introduced into the vaporizer and the operation continued for 160 minutes more; during this time another 192 g. of $CCl_4$ had disappeared and another 111 g. of product had formed, making a total of 404 g. (2.62 moles) $CCl_4$ used up, and a total of 247 g. product obtained in 260 minutes operation. The solid residue in the reaction tube now weighed 445 g.; the gain in weight due to partial conversion of $CaF_2$ into $CaCl_2$ was 55 g.

The average rate at which the $CCl_4$ vapor passed into the reaction tube during the whole run was around 10 grams per minute. The rate of reaction over the total period of 260 minutes corresponded to an S. T. Y. of $$\frac{247 \times 1440 \times 28300}{454 \times 260 \times 350} = 244.$$

After sealing up and weighing the liquid product, nearly all of it was transferred to another vessel and boiled off, the distillate being collected in a graduated condenser kept at −80° C. The following table shows the result of the distillation and indicates approximately the nature of the product.

| Boiling temp. °C. | Condensate collected in −80° receiver | | |
|---|---|---|---|
| | cc. | Vol. % of total condensate | |
| −28 | 1st drop | 0 | |
| −25 | ------ | | |
| −20 | 31 | | 103.5 cc. condensate distilling over between −28 and 0° represents approximately $CF_2Cl_2$ (b. p. −25°). |
| −15 | 72 | | |
| −10 | 89 | | |
| −5 | 97 | | |
| 0 | 103.5 | 75% | |
| +5 | 108 | | |
| +10 | 111 | | |
| +15 | 114.5 | | 135.5−103.5=32 cc. condensate between 0° and +50° represents approximately $CFCl_3$ (b. p. +25°). |
| +20 | 117.5 | | |
| +25 | 120 | | |
| +30 | 124 | | |
| +35 | 131 | | |
| +40 | 134 | | |
| +50 | 135.5 | 97.5 | |
| Plus residue boiling above 50. | 139 | 100 | 139−135.5=3.5 cc. condensate represents approximately $CCl_4$ (b. p. +77°). |

| Constituents of product | cc. liquid | Density liquid at −80° (approx.) | Grams liquid | Approx. % by wt. composition of product according to this boiling test |
|---|---|---|---|---|
| $CF_2Cl_2$ | 103.5 | 1.66 | 172 | 73 |
| $CFCl_3$ | 32 | 1.75 | 56 | 24 |
| $CCl_4$ | 3.5 | 1.82 | 6 | 3 |
| | | 1.59 | 234 | 100 |

Since the product collected was essentially a mixture of $CF_2Cl_2$ and $CFCl_3$ as shown by the boiling point, and since the non-formation of $CF_3Cl$ and $CF_4$ was shown by the fact that nothing failed to condense in the −80° receiver, we can calculate the approximate yield based on $CCl_4$, and the division of the product between $CF_2Cl_2$ and $CFCl_3$, from the data already given, i. e. from the 404 g. $CCl_4$ disappearing, the 247 g. of product collected, and the 55 g. gain in weight of the $CaF_2$.

| | Assumed composition | | | Gain in wt. of $CaF_2$ Grams | % of the $CCl_4$ disappearing, accounted for by product |
|---|---|---|---|---|---|
| | % by wt. | Grams | Moles | | |
| $CF_2Cl_2$ | 69 | 170.3 | 1.41 | 46.5 | 54 |
| $CFCl_3$ | 28 | 69.3 | 0.504 | 8.3 | 19 |
| $CCl_4$ | 3 | 7.4 | 0.05 | | |
| Total | 100% | 247.0 | 1.98 | 55. | 74 |

The composition of product thus calculated, 69% by wt. $CF_2Cl_2$, 28% by wt. $CFCl_3$, and 3% by wt. $CCl_4$, agrees approximately with that already deduced from the boiling point.

The analysis of the main portion of the product, namely of the distillate which came over between $-28°$ and $-10°$ indicated a molecular ratio of fluorine to chlorine of 1.02 to 1.00, or practically that corresponding to the formula $CF_2Cl_2$.

The amount of the $CaF_2$ utilized in this example, that is the amount of the initial fluorine content converted into $CF_2Cl_2$ and $CFCl_3$, was approximately $$\frac{1.41+\frac{0.50}{2}}{5} \times 100 = 33\%.$$

Example III

In this run the source of the $CaF_2$ used was natural crystalline fluorite, which was ground to a fine powder, then agglomerated into pill form, and the pills broken to 10–20 mesh. The reaction temperature was 500° C. In this run 51 g. of product was obtained in 245 minutes, and 90 g. of $CCl_4$ was used up. The reaction rate here corresponded to an S. T. Y. of $$\frac{51 \times 1440 \times 28300}{454 \times 245 \times 350} = 54 \text{ lbs.}$$

product per 24 hours per cu. ft. of $CaF_2$ charge in the reaction zone.

Boiling point record of product run

| Temperature | Vol. condensate | |
|---|---|---|
| $-30°$ to $-15°$ | 6 cc. | |
| $-15°$ to $-10°$ | 11 " | $17 \times 1.66 = 28.3$ g. $= 61\%$ by wt. of total product $= CF_2Cl_2$ |
| $-5°$ | 14 " | |
| 0 | 17 " | |
| $+5°$ | 17.5 cc. | |
| $+15°$ | 20. " | $9.5 \times 1.75 = 16.5$ g. $= 35\%$ by wt. of total product $= CFCl_3$ |
| $+25°$ | 22. " | |
| $+35°$ | 24. " | |
| $+50°$ | 27. " | |
| Plus residue boiling above 50° | 28. | $1 \times 1.82 = \frac{1.8 \text{ g.}}{46.6} = \frac{4\%}{100\%}$ by wt. of total product $= CCl_4$ |

Taking the composition of the product as shown by the boiling point record given above, i. e. as containing about 61% by wt. $CF_2Cl_2$, 35% $CFCl_3$ and 4% $CCl_4$, the $CF_2Cl_2$ and $CFCl_3$ collected would then account for $$\frac{.61 \times 51 \times \frac{154}{121} + .35 \times 51 \times \frac{154}{137.5}}{90 - .04 \times 51} \times 100 = 68\% \text{ of the } CCl^4$$

disappearing.

Example IV 450 grams NaF in fragments of 10–20 mesh were charged into the reaction tube and heated to a temperature between 520° C. and 570° C. and carbon tetrachloride vapors passed through as in the previous experiments. Products formed somewhat more slowly than in the case of calcium fluoride, and at the end of 3½ hours, about 1 cc. per hour was being collected. This had the same characteristics as material prepared from calcium fluoride.

I claim:

1. Process comprising bringing vapors of carbon tetrachloride into contact with a heated fluoride of the groups consisting of the alkaline earth metal fluorides and the alkali metal fluorides, said fluorides being heated to a temperature sufficient to react with the carbon tetrachloride.

2. Process comprising passing vapors of carbon tetrachloride into contact with a heated alkaline earth metal fluoride and recovering the reaction products, said fluoride being heated to a temperature sufficient to react with the carbon tetrachloride.

3. Process comprising passing vapors of carbon tetrachloride into contact with a heated alkali metal fluoride and recovering the reaction products, said fluoride being heated to a temperature sufficient to react with carbon tetrachloride.

4. Process comprising bringing vapors of carbon tetrachloride into contact with a fluoride from the groups consisting of the alkaline earth metal fluorides and the alkali metal fluorides, heated to a temperature between 350° C. and the fusion point of the solid fluoride-chloride mixture formed by the reaction and recovering carbon-chlorine-fluorine compounds from the resulting gases.

5. Process comprising passing carbon tetrachloride vapors into contact with a fluoride from the groups consisting of the alkaline earth metal fluorides and the alkali metal fluorides, heated to between 450° C. and 550° C., and recovering the reaction products.

6. Process comprising passing vapors of carbon tetrachloride into contact with heated calcium fluoride and recovering the reaction products, said fluoride being heated to a temperature sufficient to react with the carbon tetrachloride.

7. Process comprising passing vapors of carbon tetrachloride into contact with heated sodium fluoride and recovering the reaction products, said fluoride being heated to a temperature sufficient to react with the carbon tetrachloride.

8. Process comprising bringing vapors of carbon tetrachloride into contact with calcium fluoride heated to a temperature between 350° C. and the fusion point of the calcium fluoride-chloride mixture formed by the reaction and recovering carbon-chlorine-fluorine compounds from the resulting gases.

9. Process comprising bringing vapors of carbon tetrachloride into contact with sodium fluoride heated to a temperature between 350° C. and the fusion point of the sodium fluoride-chloride mixture formed by the reaction and recovering carbon-chlorine-fluorine compounds from the resulting gases.

10. Process comprising passing vapors of carbon tetrachloride into contact with calcium fluoride heated to a temperature between 350° C. and the fusion point of the solid calcium fluoride-chloride mixture formed by the reaction, recovering carbon-chlorine-fluorine compounds and returning unreacted carbon tetrachloride to the reaction system.

11. Process for the production of a mixture of carbon-chlorine-fluorine compounds, predominantly dichloro difluoro methane, comprising passing vapors of carbon tetrachloride into contact with calcium fluoride heated to a temperature between 350° C. and the fusion point of the solid calcium fluoride-chloride mixture formed by the reaction, returning a major portion of the trichloro monofluoro methane from the resulting gases to the reaction system and collecting the residual portion of said gases.

12. Process comprising passing carbon tetrachloride vapors into contact with calcium fluoride heated to between 450° C. and 550° C. and recovering the reaction products.

13. Process comprising passing carbon tetrachloride vapors into contact with sodium fluoride heated to between 450° C. and 550° C. and recovering the reaction products.

14. Process comprising bringing vapors of carbon tetrachloride into contact with calcium fluoride heated to a temperature between 450°–550° C. and recovering carbon-chlorine-fluorine compounds from the resulting gases.

15. Process comprising passing vapors of carbon tetrachloride into contact with calcium fluoride heated to a temperature between 450–550° C. recovering carbon-chlorine-fluorine compounds and returning unreacted carbon tetrachloride to the reaction system.

16. Process for the production of a mixture of carbon-chlorine-fluorine compounds, predominantly dichloro difluoro methane, comprising passing vapors of carbon tetrachloride into contact with calcium fluoride heated to a temperature between 450–550° C. returning a major portion of unreacted carbon tetrachloride and a substantial portion of the trichloro monofluoro methane from the resulting gases to the reaction system and collecting the residual portion of said gases.

17. Process for the production of a mixture of carbon-chlorine-fluorine compounds, predominantly dichloro difluoro methane, comprising passing vapors of carbon tetrachloride into contact with calcium fluoride heated to a temperature between 350° C. and the fusion point of the solid calcium fluoride-chloride mixture formed by the reaction, cooling the resulting gases to approximately about 0° C. and collecting the residual portion of said gases.

18. Process for the production of a mixture of carbon-chlorine-fluorine compounds, predominantly dichloro difluoro methane, comprising passing vapors of carbon tetrachloride into contact with calcium fluoride heated to a temperature between 450°–550° C., cooling the resulting gases to approximately about 0° C. and collecting the residual portion of said gases.

19. Process for the production of a mixture of carbon-chlorine-fluorine compounds comprising passing vapors of carbon tetrachloride into contact with calcium fluoride heated to a temperature between 350° C. and the fusion point of the solid calcium fluoride-chloride mixture formed by the reaction, cooling the resulting gases to a temperature between approximately 40° C. and 50° C. and collecting the residual portion of said gases.

20. Process for the production of a mixture of carbon-chlorine-fluorine compounds comprising passing vapors of carbon tetrachloride into contact with calcium fluoride heated to a temperature between 450–550° C. cooling the resulting gases to a temperature between approximately 40° C. and 50° C. and collecting the residual portion of said gases.

Signed at Perth Amboy in the county of Middlesex and State of New Jersey this 22nd day of July A. D. 1930.

BURRITT SAMUEL LACY.